United States Patent
Robertson et al.

(10) Patent No.: US 11,210,252 B1
(45) Date of Patent: Dec. 28, 2021

(54) DIRECTING CONTROL DATA BETWEEN SEMICONDUCTOR PACKAGES

(71) Applicant: HEWLETT PACKARD ENTERPRISE DEVELOPMENT LP, Houston, TX (US)

(72) Inventors: Naysen J. Robertson, Roseville, CA (US); Robert L. Noonan, Crystal Lake, IL (US); David F. Heinrich, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 23 days.

(21) Appl. No.: 16/896,863

(22) Filed: Jun. 9, 2020

(51) Int. Cl.
| | | |
|---|---|---|
| G06F 13/40 | (2006.01) | |
| G06F 13/368 | (2006.01) | |
| G06F 13/16 | (2006.01) | |
| G06F 9/54 | (2006.01) | |
| G06F 9/46 | (2006.01) | |
| G06F 9/48 | (2006.01) | |

(52) U.S. Cl.
CPC .......... *G06F 13/4031* (2013.01); *G06F 9/466* (2013.01); *G06F 9/4812* (2013.01); *G06F 9/544* (2013.01); *G06F 9/546* (2013.01); *G06F 13/1668* (2013.01); *G06F 13/368* (2013.01)

(58) Field of Classification Search
CPC .... G06F 13/4031; G06F 9/466; G06F 9/4812; G06F 9/544; G06F 9/546; G06F 13/1668; G06F 13/368
USPC ....................................................... 710/110
See application file for complete search history.

(56) References Cited

U.S. PATENT DOCUMENTS

| | | | | |
|---|---|---|---|---|
| 4,694,398 A | * | 9/1987 | Croteau | G01T 1/1647 378/901 |
| 5,269,021 A | * | 12/1993 | Denio | G06F 9/4484 719/323 |
| 6,505,263 B1 | * | 1/2003 | Larson | G06F 13/385 710/100 |
| 6,687,260 B1 | * | 2/2004 | Peace | H04L 12/403 370/450 |
| 7,260,590 B1 | * | 8/2007 | Williams | G06F 11/1464 707/615 |
| 7,831,754 B1 | | 11/2010 | Chen et al. | |
| 7,839,169 B2 | | 11/2010 | Murotake et al. | |
| 7,934,038 B1 | | 4/2011 | Kao et al. | |
| 8,264,953 B2 | | 9/2012 | Licardie et al. | |
| 8,417,765 B2 | | 4/2013 | Bittles et al. | |
| 10,417,171 B1 | | 9/2019 | Sarmah et al. | |
| 2002/0087786 A1 | * | 7/2002 | Burton | G06F 3/0605 711/112 |

(Continued)

*Primary Examiner* — Paul R. Myers
(74) *Attorney, Agent, or Firm* — Trop, Pruner & Hu, P.C.

(57) ABSTRACT

A processor executes firmware to write control data describing transfer descriptors for a bus protocol engine to an address that is associated with a transfer descriptor buffer for the bus protocol engine. The bus protocol engine performs an operation according to the transfer descriptors with a slave device; the processor is part of a first semiconductor package; the bus protocol engine is part of a second semiconductor package other than the first semiconductor package; and the address corresponds to a memory of the second semiconductor package. A first physical interface of the first semiconductor package communicates with a second physical interface of the second semiconductor package to direct the control data to the memory.

20 Claims, 8 Drawing Sheets

(56) References Cited

U.S. PATENT DOCUMENTS

| | | | |
|---|---|---|---|
| 2008/0219159 A1* | 9/2008 | Chateau | H04L 69/32 |
| | | | 370/230 |
| 2012/0079145 A1* | 3/2012 | Chang | G06F 13/4295 |
| | | | 710/105 |
| 2012/0166692 A1* | 6/2012 | Wang | G06F 13/387 |
| | | | 710/105 |

* cited by examiner

DIRECTING CONTROL DATA BETWEEN SEMICONDUCTOR PACKAGES

BACKGROUND

An application specific integrated circuit (ASIC) is an integrated circuit (IC) that is designed for a specific use. For purposes of reducing circuit board area, an embedded processing subsystem, such as a subsystem that includes a System on Chip (SoC), baseboard management controller (BMC) or multiple function microprocessor, may include one or multiple ASICs. In general, an ASIC may be generally "hardened" and be challenging to change once fabricated. The monetary and human resource costs to spin (i.e., rebuild, including redesign and refabricate) a new or modified ASIC may be significant.

DETAILED DESCRIPTION

Figure 1:
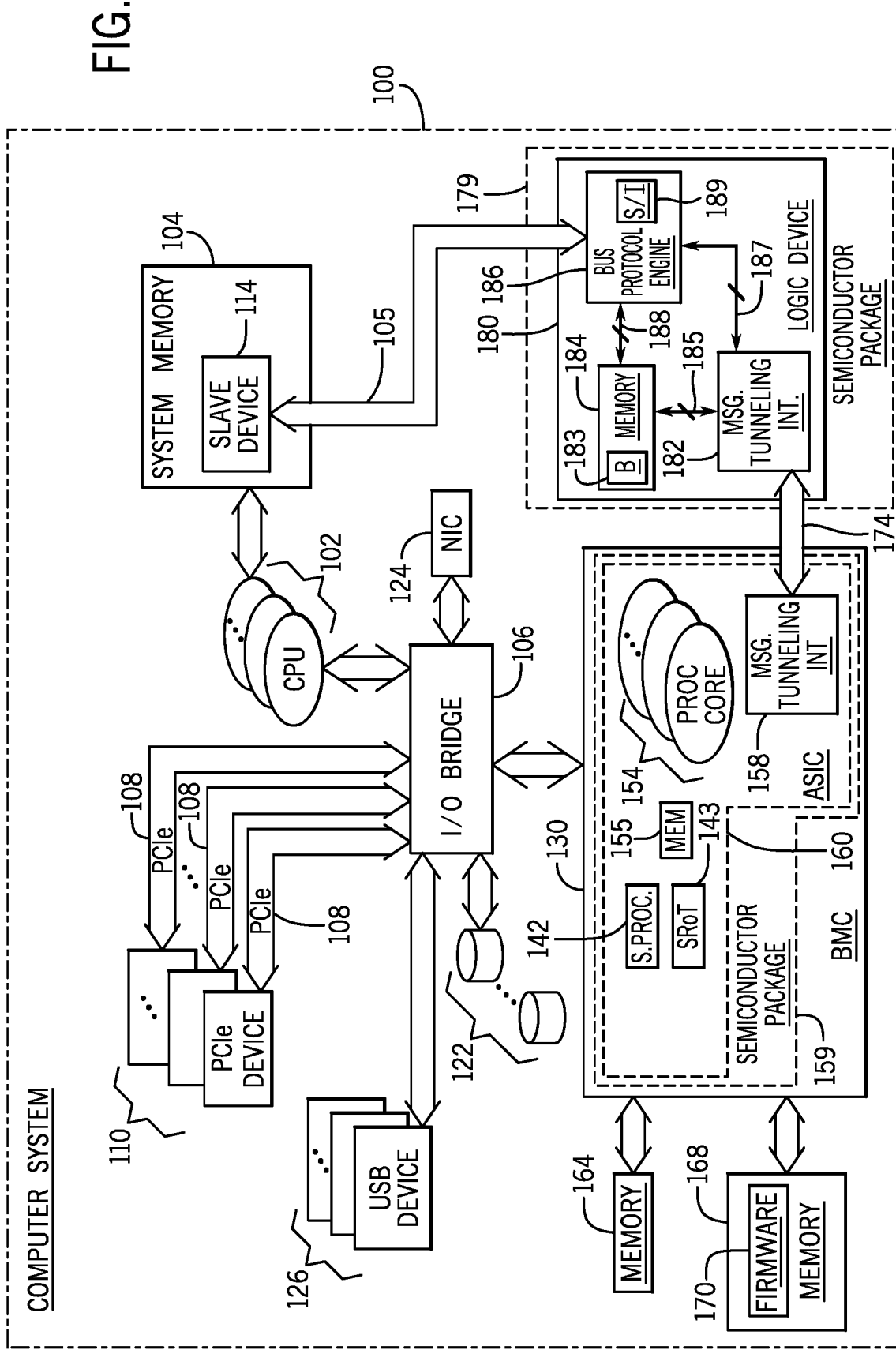
FIG. 1 is a schematic diagram of a computer system according to an example implementation.

A computer system may include a baseboard management controller (BMC) that monitors the physical state of the computer system and may communicate with a management system through a management network. As examples of its roles, the BMC may monitor sensors (e.g., temperature sensors, cooling fan speed sensors); monitor operating system status; monitor power statuses; log computer system events; and provide management functions for the computer system, which may be controlled remotely. Moreover, the BMC may allow operations to be performed when the computer system is powered down and before the operating system has booted; and the BMC may be used to perform recovery operations after an operating system or computer system failure.

In the pre-boot environment, the BMC may communicate with slave devices of the computer system. For example, the BMC may communicate with serial presence detect (SPD) devices (e.g., electrically erasable programmable read-only memory (EEPROM) devices) of memory modules (e.g., dual inline memory modules (DIMMs)) of the computer system for purposes of acquiring data that represents information about the memory modules. As examples, the information pertains to characteristics and capabilities of the memory modules, such as a memory device type, a module type, a row and column addressing scheme, a minimum cycle time, a maximum cycle time, a column address selection (CAS) latency, a minimum row pre-charge delay time, and so forth. The BMC may communicate this information to a host CPU so that the host CPU may set up computer system interfaces (e.g., a physical memory interface and a memory controller).

For purposes of providing the roles mentioned above as well as other roles, an ASIC of the BMC may include one or multiple general purpose processors (e.g., embedded processing cores). The BMC, for these purposes, may communicate with components of the computer system using one or multiple communication interfaces (e.g., bus interfaces, such as an I$^2$C bus interface, a system management bus (SMB) interface, a Peripheral Component Interconnect express (PCIe) interface, an Ethernet bus interface, and so forth).

Computer technology is ever evolving, and a hardware platform vendor may revise a hardware platform design to address technology advances. For example, a hardware platform design may be revised to implement a new bus standard. Adapting the BMC to be compliant with the new bus standard may involve updating an ASIC of the BMC to communicate using the new bus standard. For example, the ASIC may have an I$^2$C bus interface, and adapting the BMC to support I$^3$C communication may involve adding I$^3$C support to the I$^2$C bus interface or adding an I$^3$C bus interface. One approach to upgrade the BMC with such capabilities is to respin the ASIC. In this context, a "respin" of the ASIC refers to a rebuilding of the ASIC, including a redesign and a refabrication. In this manner, the ASIC may be redesigned and refabricated to have new hardware components, such as a new I$^3$C bus interface or an upgraded bus interface that support both I$^2$C bus and I$^3$C bus protocols. The respinning of the ASIC, however, may have relatively large monetary and human resource costs.

Another solution to upgrade the capabilities of the BMC is to use an external third-party component (e.g., a third-party I$^3$C bus protocol engine) with the BMC to allow the unmodified BMC to support the new feature(s). A challenge with this latter approach is that the third-party component may be untrusted. For implementations in which the BMC orchestrates the security of the computer system, using a third-party component may compromise system security. For example, for a third party I$^3$C bus protocol engine, the retrieval of information about the computer system's memory modules may be under the control of an untrusted entity, instead of being under control of the BMC. Moreover, the use of a third-party component with the BMC may involve reading and signing the software/firmware model for the corresponding infrastructure that incorporates the third-party component; and using a third-party component may add to the costs of the computer system.

In accordance with example implementations that are described herein, a bridge, or physical communication interface, of an ASIC, such as a message-encapsulating tunneling interface, is used to communicate control data (e.g., transfer descriptors and bus protocol engine control interface data) to an "off chip" bus protocol engine that is part of a semiconductor package other than the semiconductor package that contains the ASIC. As an example, this other semiconductor package may contain a programmable logic device, which may be trusted and may be programmed to implement a particular interface (e.g., an $I^3C$ bus engine interface) for the ASIC. Therefore, instead of implementing a hardware change that may involve respinning the ASIC or using an untrusted third-party component, the firmware of the ASIC may be modified to change addresses (e.g., an address of a transfer descriptor buffer and addresses corresponding to control and status registers (CSRs) of a bus protocol engine) that are written by the general purpose processing core(s) of the ASIC. As such, the ASIC (and BMC) may be updated through firmware and a trusted, programmable logic device to implement a new communication interface for the BMC.

Referring to FIG. 1, as a more specific example, in accordance with some implementations, a computer system 100 includes an ASIC 160 that may perform one or multiple functions for the computer system. The ASIC 160 includes one or multiple general purpose processing cores 154 that execute machine executable instructions, such as firmware, for purposes of performing one or more of these functions. As depicted in FIG. 1, the ASIC 160 may be part of a semiconductor package 159. In this context, a "semiconductor package" refers to a casing, or encapsulation, which contains one or multiple integrated circuits, such as the ASIC 160. The integrated circuit(s) of the semiconductor package may be disposed on one or multiple die; and the semiconductor package may contain leads (also called "contacts," "external contacts," "terminals," "external terminals," and so forth), which allow signals, voltages, currents, and so forth to be communicated between the integrated circuit(s) of the semiconductor package and one or multiple components outside of the semiconductor package. The semiconductor package may take on one of numerous forms, such as a through-hole package, a surface mount package, a chip carrier package, a pin grid array package, a flat package, a small outline package, a chip-scale package, a ball grid array package, and so forth.

For the specific implementation that is depicted in FIG. 1, the ASIC 160 is part of a BMC 130. In accordance with example implementations, the BMC 130 is an embedded subsystem, which may contain one or multiple semiconductor packages other than the semiconductor package 159. As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with example implementations, the ASIC 160 has been adapted, or upgraded, using firmware changes and an external programmable logic device 180 (e.g., a complex programmable logic device (cPLD)) to perform one or multiple functions for the computer system 100, which the hardware of the ASIC 160 was not specifically constructed to perform. In accordance with further implementations, an integrated circuit other than a programmable logic device may be used to perform the functions of the device 180 and be used in substitution thereof, such as an ASIC, a field programmable gate array (FPGA), and so forth.

In accordance with example implementations, the ASIC 160 includes a bridge, or physical communication interface 158 (e.g., a message-encapsulating tunneling communication interface), that communicates with a corresponding bridge, or physical communication interface 182 (e.g., a message encapsulating tunneling communication interface), of the logic device 180. In accordance with example implementations, the communication interfaces 158 and 182 establish a duplex communication link 174 between the ASIC 160 and the logic device 180. In accordance with example implementations, the communication interfaces 158 and 182 enable the redirection of data accesses (e.g., read operations and write operations) and signal assertions (e.g., interrupt signal assertions) to the hardware (e.g., memory and bus protocol engine) of the logic device 180 for purposes of upgrading features of the ASIC 160 (and BMC 130). In accordance with example implementations, the logic device 180 may be part of a semiconductor package 179, and for these example implementations, the communication interfaces 158 and 182 establish communication between the semiconductor packages 159 and 179.

In accordance with example implementations, the logic device 180 may be programmed to implement hardware that is used by the ASIC 160 (and the BMC 130). In particular, for the example implementation of FIG. 1, the logic device 180 is programmed to implement a bus protocol engine 186. In accordance with example implementations, firmware of the ASIC 160 may use the bus protocol engine 186 to perform bus transfers to/from one or multiple slave devices of the computer system 100.

More specifically, in accordance with example implementations, a system memory 104 of the computer system 100 may include one or multiple slave devices 114 that are accessible using bus transfers (e.g., read transfers) on an $I^3C$ bus 105. For these example implementations, the slave device 114 may be an SPD device that is part of a memory module of the system memory 104 and which stores information about the memory module. In accordance with further example implementations, the ASIC 160 may use the bus protocol engine 186 (or another such off-chip engine, whether disposed on the semiconductor package 179 or another semiconductor package) to communicate with slave devices 114 other than SPD devices. An SPD device storing data representing information about a memory module is an example of a slave device 114 that has a primary function of storing system data. In this context, the "system data" refers to content that pertains to one or multiple components of the computer system 100 other than the slave device 114, such as, for example, content that represents information about a memory module. Although, in accordance with some implementations, a particular slave device 114 may have a primary function of storing system data, in accordance with further example implementations, a given slave device 114 may have a primary function other than a function of storing system data. As examples, in accordance with some implementations, a given slave device 114 may be a sensor (e.g., a temperature sensor or a voltage sensor), a power management integrated circuit (PMIC) controller, a residual current device (RCD), an SPD device whose primary function is not storing system data, and so forth. It is noted that the bus 105 may be bus other than an I$^3$C bus, and the bus protocol engine 186 may communicate signals on this other bus according to the protocol used by the other bus, in accordance with further implementations.

As depicted in FIG. 1, in accordance with example implementations, in addition to the bus protocol engine 186, the logic device 180 includes a local memory 184 (e.g., a block random access memory (BRAM)). As depicted in FIG. 1, in accordance with example implementations, the logic device 180 may include a communication path 185 between the communication interface 182 and the memory 184; a communication path 187 between the communication interface 182 and the bus protocol engine 186; and a communication path 188 between the bus protocol engine 186 and the memory 184.

In general, a general purpose processing core 154 of the ASIC 160, through firmware execution, may program, or set up, bus transfers to be performed by the bus protocol engine 186 using the I$^3$C bus 105. More specifically, in accordance with example implementations, the processor core 154 may, through firmware execution, write transfer descriptors (i.e., data describing bus transfers to be performed by a bus protocol engine) that are stored in a transfer descriptor buffer 183 of the memory 184, and the processor(s) core 154 may, through firmware execution, store data associated with write bus transfers in the memory 184 and read data resulting from read bus transfers. By reading and writing data to/from the memory 184 and reading transfer descriptors from the transfer descriptor buffer 183, the bus protocol engine 186 performs corresponding bus transfers over the I$^3$C bus 105 without direct processing core 154 involvement.

As described herein, in accordance with example implementations, firmware, and not hardware, changes may be used to upgrade the ASIC 160 (and BMC 130) to use the features of the logic device 180. In accordance with example implementations, the ASIC 160 takes advantage of the communication link 174 to separate, or disaggregate, transaction data and control data to allow the hardware of the logic device 180 to be accessed in a manner that is transparent to the firmware of the ASIC 160.

More specifically, in accordance with example implementations, older version firmware of the ASIC 160 may be upgraded to access memory of the ASIC 160 by changing the addresses that are used by the firmware. In this context, "memory" generally refers to an addressable location that stores data and may be, as examples, a memory of a nonvolatile or volatile memory device, such as the memory 184, or a register or register interface, such as a register memory space of the bus protocol engine 186.

In accordance with example implementations, for purposes of accessing slave devices, such as a slave device 114, through a bus transfer, the firmware of the ASIC 160 writes a transfer descriptor to a transfer descriptor buffer. The older version of the firmware may write the transfer descriptor to an address that corresponds to a transfer descriptor buffer of the ASIC 160 (e.g., a transfer descriptor buffer that is used to control an I$^2$C bus protocol engine existing internal to ASIC 160). Through an address change, the firmware may be updated so that the write to the transfer descriptor buffer occurs to an address that corresponds to the transfer descriptor buffer 183 of the logic device 180. Moreover, through an address change, the firmware may be updated so that a write or read that was originally directed to a slave control interface of the bus protocol engine of the ASIC 160 is now directed to an address that corresponds to a slave interface 189 (e.g., control and status registers (CSRs)) of the bus protocol engine 186.

In accordance with example implementations, the addresses of the transfer descriptor buffer 183 and slave interface 189 each have two components: a base address and an offset address. In accordance with example implementations, from the perspective of the updated firmware of the ASIC 160, the base address for all addressable components of the logic device 180 is the address of the communication interface 158 of the ASIC 160, and the offset address corresponds to the offset address within the logic device 180. In other words, in accordance with example implementations, each addressable component of the logic device 180 has the same base address and a different offset address. By replacing the addresses (e.g., transfer descriptor buffer address, memory address, and slave control interface addresses) of hardware components used by older version firmware with addresses that correspond to their hardware components in the logic device 180, the ASIC 160 may be upgraded to support newer technology (e.g., upgraded to support I$^3$C technology or other communication protocols) without involving a respin of the ASIC 160, the use of untrusted third party components, or the additional expense of using third party components. Moreover, in accordance with example implementations, the communication interfaces 158 and 182 provide a relatively low pin count communication link 174, which effectively serves as a input/output (I/O) expander to expand the possible functions that may be performed by the ASIC 160 while minimizing the ASIC's pin count.

The transfer descriptors describe corresponding bus transfers and are read and executed by the bus protocol engine 186. In accordance with example implementations, to perform a bus transfer (or "bus operation"), the firmware of the ASIC 160 first writes one or multiple transfer descriptors that describe the bus transfer (e.g., read or write command, write data, and so forth) to the transfer descriptor buffer 183, and then, the firmware writes a "start" command to a command register field of the slave interface 189 to initiate the bus transfer. The firmware may also monitor a status of the bus transfer by reading one or multiple status register fields of the slave interface 189; and the firmware may read data resulting from a read bus transfer by reading data from the memory 184.

Moreover, as further described herein, the communication interfaces 158 and 182 may communicate in-band virtual signal assertions that are associated with bus transfers. In this context, a "virtual signal assertion" refers to data that represents a particular signal state (e.g., an interrupt assertion). As examples, the "signal state" may represent whether a particular physical signal has a logic one or logic zero level, or may, as another example, represent whether a bit is a logic one or logic zero bit. An "in-band" virtual signal assertion refers to the virtual signal assertion being communicated in the same channel as other data (e.g., read data, data to be written, CSR data, and so forth). In accordance with example implementations, in response to the assertion of a particular signal on the logic device 180, a virtual signal assertion is generated on the logic device 180 and transmitted to the ASIC 160; and in response to receiving the virtual signal assertion, the ASIC 160 asserts a signal to mimic the assertion of the signal on the logic device 180. As a more specific example, the bus protocol engine 186 may assert an interrupt indicating completion of a particular read or write operation. The communication interface 182 of the logic device 180, in response to the interrupt, communicates data representing a virtual interrupt signal assertion to the communication interface 158. The communication interface 158, in response to the received virtual signal assertion, asserts the corresponding interrupt (e.g., a hardware interrupt or a software interrupt) on the ASIC 160 to notify a processing core 154 of the completion of the bus transfer.

As a more specific example, in accordance with example implementations, the bus protocol engine 186 may perform a bus operation, or bus transfer, via the I$^3$C bus 105 to read memory parameters of system memory modules from slave devices 114. To set up the bus transfer, the firmware of the ASIC 160 may write a corresponding transfer descriptor to the transfer descriptor buffer 183 that describes a read transfer over the I$^3$C bus 105 to a slave device 114, and then the firmware may write a "start" command to a command register field of the slave interface 189 to initiate the beginning of the bus read transfer by the bus protocol engine 186. The bus protocol engine 186 then performs the read bus transfer to read the memory parameters from the slave device 114 and store the read data in the local memory 184 of the logic device 180. At the end of the bus transfer, the bus protocol engine 186, in accordance with example implementations, generates an interrupt to indicate completion of the operation. The corresponding virtual interrupt is then communicated by the communication interfaces 158 and 182 such that the receipt of the virtual interrupt by the communication interface 158 causes the interface 158 to generate an interrupt to notify a processing core 154 to the completion of the bus transfer and the availability of the data in the memory 184. The processing core 154 may then service the interrupt by reading data from the memory 184.

The computer system 100 may have any of a number of a different architectures and forms. As examples, the computer system 100 may be a server, a client, a desktop computer, a laptop computer, a tablet computer, a smartphone, a wearable computer, a rack mounted module, a networking device, and so forth.

In accordance with example implementations, the computer system 100 includes one or multiple central processing units (CPUs) 102 (e.g., CPU processing cores, semiconductor containing CPU processor cores, and so forth), and memory devices (e.g., memory modules) that are coupled to the CPU(s) 102 to form the system memory 104. The CPU(s) 102 may be coupled to an input/output (I/O) bridge 106, which allows communications between the CPU(s) and the BMC 130, as well as communications with various I/O devices, such as storage drives 122, one or multiple network interface card(s) 124, Universal Serial Bus (USB) devices 126, and so forth. Moreover, as also depicted in FIG. 1, the computer system 100 may include one or multiple Peripheral Component Interconnect Express (PCIe) devices 110 (e.g., PCIe expansion cards) that are coupled to the I/O bridge 106 through individual PCIe bus(es) 108.

The general purpose processing core(s) 154 of the BMC 130, in accordance with example implementations, may execute firmware instructions 170 that are stored in a non-volatile memory 168. In accordance with example implementations, the firmware instructions 170 include instructions that are executed by components of the computer system 100 other than the general purpose processing cores 154. In accordance with example implementations, the firmware instructions 170 include instructions that are executed by a security processor of the BMC 130 (as part of the BMC's security plane); instructions that are executed by the general processing core(s) 154 of the BMC 130 (i.e., firmware corresponding to a management firmware stack corresponding to a management plane of the BMC 130); and instructions that are executed by the CPU(s) 102 to boot the computer system 100 and provide runtime services. The computer system 100 may also include a volatile memory 164 that may be accessed and used by the BMC 130.

In general, the memory devices that form the system memory 104, the firmware memory 168, the volatile memory 164 and the slave devices 114, as well as other memory devices that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices, EEPROM devices, and so forth), unless otherwise stated herein.

In general, after being powered on or reset, the BMC 130 holds the general purpose processing core(s) 154 in reset. After performing initial root of trust security checks as well as other checks (e.g., hardware fault checks), the baseboard management controller 130 releases the general purpose processing core(s) 154 from reset. In accordance with example implementations, the BMC 130 includes a hardware, silicon root-of-trust (SRoT) engine 143. In accordance with example implementations, the BMC 130 stores an immutable fingerprint, which is used by the SRoT engine 143 to validate machine executable instructions.

More specifically, in accordance with example implementations, in response to the BMC 130 being powered on or reset, the SRoT engine 143 validates and then loads an initial portion of the firmware instructions 170 into a memory 155 of the BMC 130 so that this firmware portion is now trusted. The security processor 142 is then allowed to boot and execute the loaded firmware instructions. By executing the firmware instructions, the security processor 142 may then validate another portion of the firmware instructions 170 that corresponds to a portion of the BMC's management firmware stack and after validation, load this portion of the firmware stack into a memory 155 of the BMC 130. The portion of the management firmware stack may then be executed by the general purpose processing core(s) 154, which causes the processing core(s) 154 to load additional portions of the firmware instructions 170 and place the loaded portions into the memory 164. Those instructions may be executed from the validated portion of the BMC's firmware stack in the memory 155. In accordance with example implementations, the BMC 130 may lock the memory 155 to prevent modification or tampering with the validated portion(s) stored in the memory 155.

In accordance with example implementations, the firmware instructions that are loaded into the memory 155 and executed by the processing core(s) 154 may include instructions corresponding to a firmware driver (i.e., an example of the "firmware" described herein), which (as an example) may use the logic device 180 to perform data transfers via the I³C bus 105. More specifically, in accordance with example implementations, the general purpose processing core(s) 154 may execute a firmware driver to access slave devices 114. For example, a general purpose processing core 154 may, in response to executing a firmware driver, use the bus protocol engine 186 to read memory parameters for memory modules of the system memory 104; and the BMC 130 may then provide these parameters to a CPU 102 so that the CPU 102 may use the memory parameters to setup the computer system 100 (e.g., program a physical memory interface) to use the memory devices.

Figure 2:
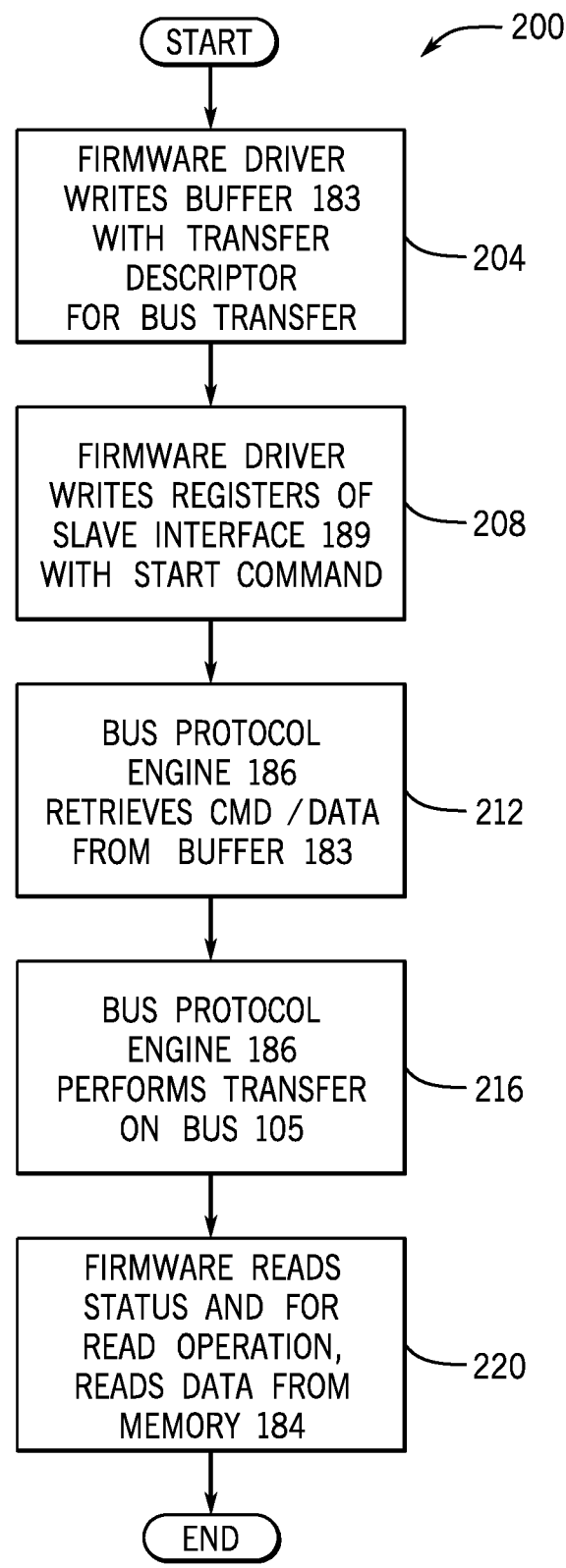
FIG. 2 is a schematic diagram of a firmware process executed by a processing core of an application specific integrated circuit (ASIC) of FIG. 1, which uses a message tunneling interface to control an off-chip bus protocol engine to access a slave device according to an example implementation.
Figure 3:
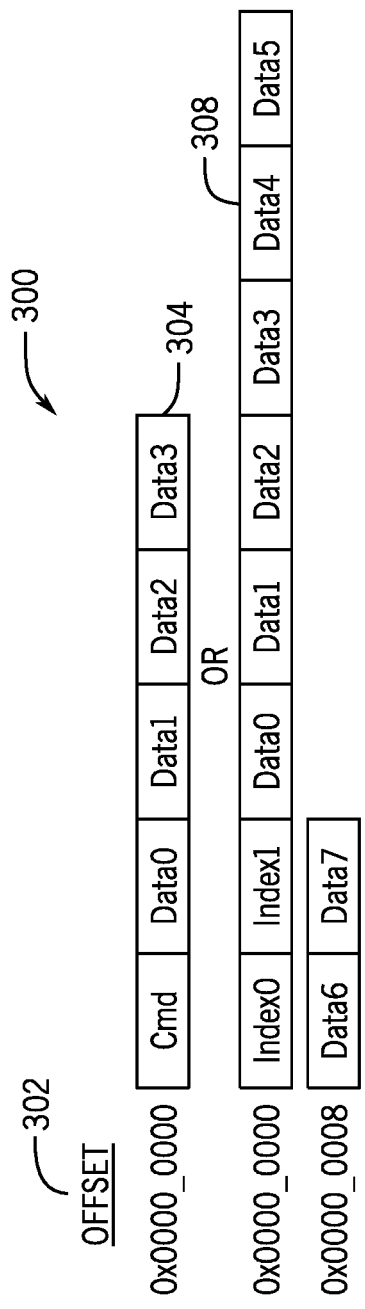
FIG. 3 is an illustration of transfer descriptors according to an example implementation.

In accordance with example implementations, a general purpose processing core 154 of the BMC 130 may execute firmware instructions that correspond to a firmware driver (e.g., part of the firmware loaded into the memory 155) to perform a process 200 that is illustrated in FIG. 2 for purposes of accessing a slave device 114 (e.g., for purposes of reading data from or writing data to the slave device 114). Referring to FIG. 2 in conjunction with FIG. 1, through the execution of the firmware driver, the processing core 154 performs a write, pursuant to block 204, to the transfer descriptor buffer 183 to fill the buffer 183 with one or multiple transfer descriptors describing the bus transfer. FIG. 3 is an illustration 300 of example transfer descriptors 304 and 308. Referring also to FIG. 3, the transfer descriptors 304 and 308 may be written to certain offsets 302 within the transfer descriptor buffer 183. As an example, as depicted in FIG. 3, a particular transfer descriptor 304 may include a command and data. The command may be, for example, a read or write command; and, as an example, the data may be the data for a write bus transfer. As also depicted in FIG. 3, a transfer descriptor 308 may be stored in the buffer 183, which contains indices and data. For example, the indices may represent a linking between transfer descriptors, and as an example, the data may be data to be written. The processing core 154 writes the transfer descriptor data to an address that corresponds to an address of the buffer 183. More specifically, in accordance with example implementations, for this write, the address represents the summation of a base address that points to the communication interface 158 and an offset address, which corresponds to the offset address of the buffer 183 in the logic device 180.

Figure 4:
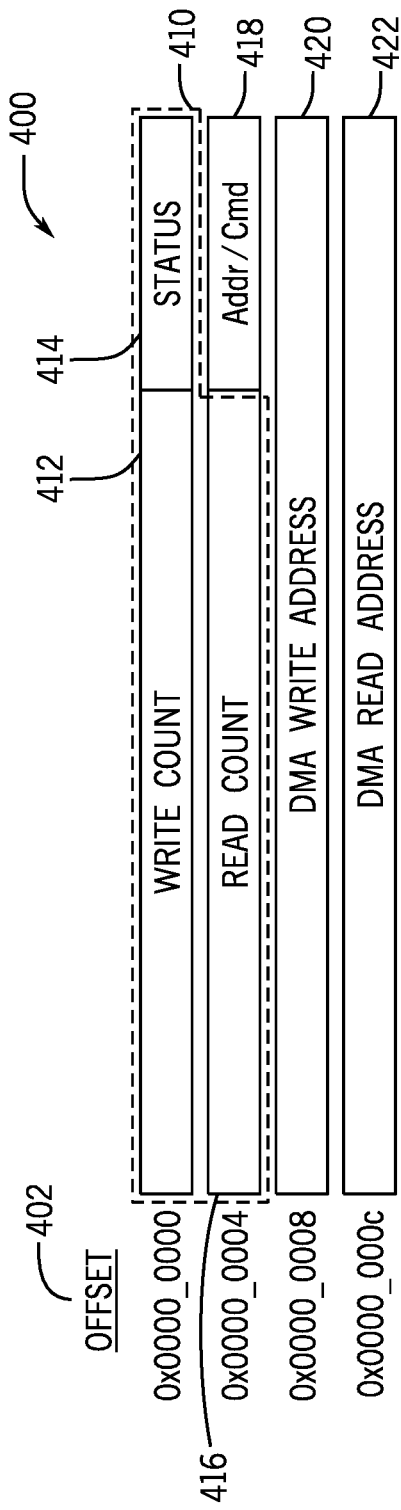
FIG. 4 is an illustration of control and status registers (CSRs) of the bus protocol engine according to an example implementation.

Continuing with the example process 200 of FIG. 2, the firmware driver may then cause the processing core 154 to write (block 208) control data to the slave interface 189. FIG. 4 depicts CSRs 400 of the slave interface 189 of the bus protocol engine 186, in accordance with example implementations. Referring also to FIG. 4, as depicted in FIG. 4, the CSRs 400 may be addressable via offset addresses 402 and include a set 410 of registers representing the status of a particular bus transfer, such as registers 412, 414 and 416 that represent a write count, a status and a read count, respectively. The CSRs 400 may also include, as an example, a DMA write address register 420, a DMA read address register 422 and an address/command register 418. In accordance with example implementations, pursuant to block 208, the execution of the firmware may cause the processing core 154 to write a start command to the register 418 to begin the bus transfer that is represented by a transfer descriptor in the buffer 183. This write, in accordance with example implementations, is directed to an address that corresponds to a base address corresponding to the communication interface 158 and an offset corresponding to the offset address of the register 418 in the logic device 180.

The bus protocol engine 186 performs the requested bus transfer, which may include performing a data transfer on the I³C bus 105. Therefore, as depicted in block 212, the bus protocol engine 186 retrieves commands and/or data from the buffer 183 and then performs (block 216) the transfer on the I³C bus 105. In accordance with example implementations, upon completion of the bus transfer operation (successful or not), the bus protocol engine 186 generates an interrupt to represent the completion, and the communication interface 182 of the logic device 180 correspondingly communicates a virtual in-band interrupt assertion to the communication interface 158 of the ASIC 160. In accordance with example implementations, the communication interface 158, in response to the virtual in-band interrupt assertion, asserts an interrupt signal in the ASIC 160 to notify the processing core 154 as to the completion of the bus transfer operation. An interrupt service routine of the processing core 154 may then be executed by the processing core 154 to read the status registers 410 (FIG. 4) for purposes of reading a result of the bus transfer. The reading of the status registers 410 by the processing core 154 may be directed to an address that is formed from a base address that corresponds to the communication interface 158 and an offset address that corresponds to the offset of the registers 410 in the logic 160.

Figure 5:
FIG. 5 is an illustration of data returned as a result of a bus transfer performed by the bus protocol engine according to an example implementation.

Pursuant to block 220 of the process 200, the firmware driver may then cause the processing core 154 to read a status of the bus transfer (i.e., access the CSRs of the slave interface 189 using a base address corresponding to the communication interface 158 and an offset address corresponding to the CSRs). If the operation is a read operation and the data in the CSRs show that the read operation is successful, the processing core 154 may then retrieve, or fetch, the read data from the memory 184. For this read, the read address is formed from a combination of the base address of the communication interface 158 and an offset address that corresponds to the location in the memory 184 of the data within the logic device 180. FIG. 5 depicts an illustration 500 in which eight bytes may be retrieved, although other data sizes may be retrieved in a read operation, in accordance with further implementations.

Figure 6:
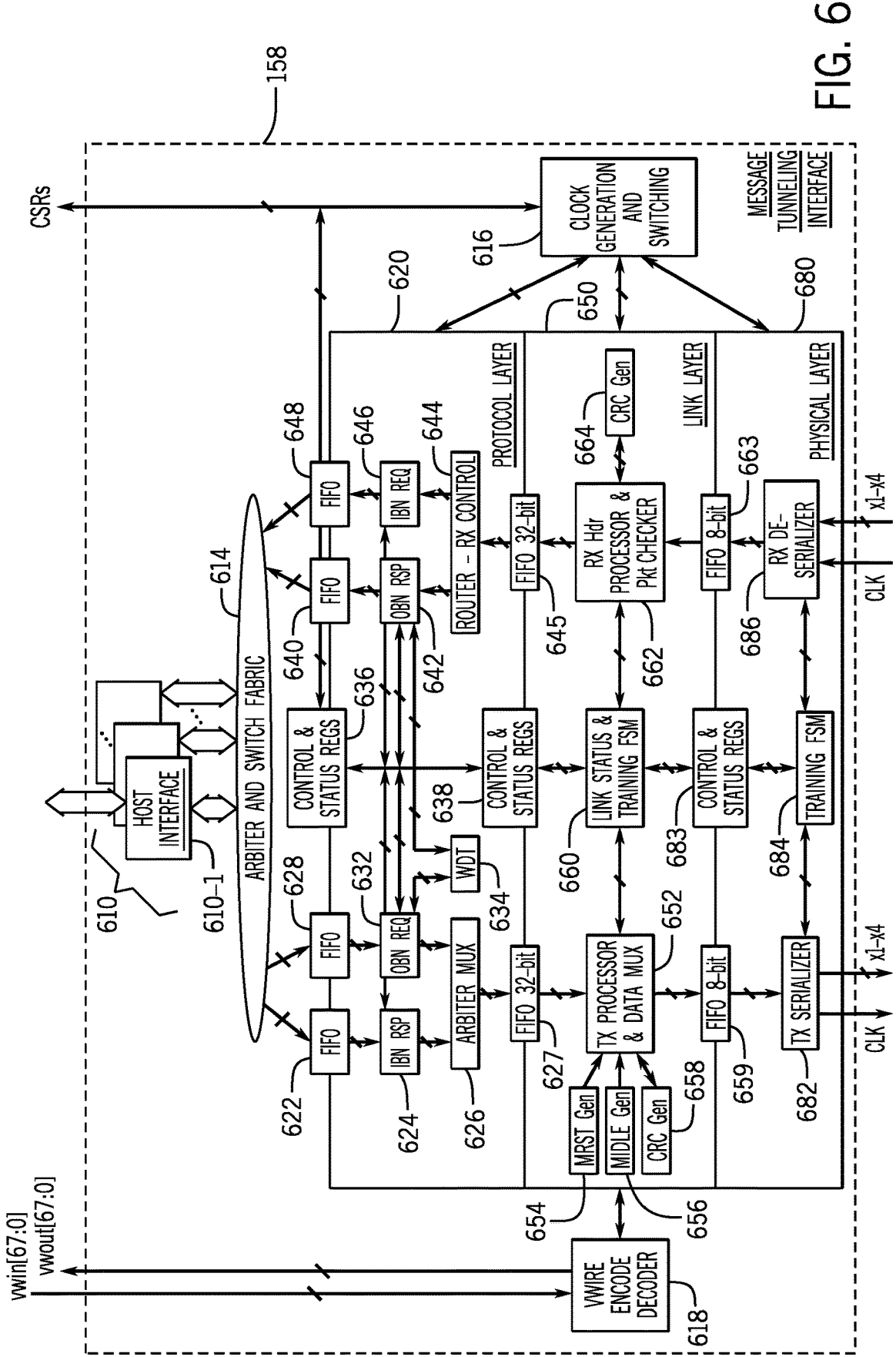
FIG. 6 is a schematic diagram of a message tunneling interface of the ASIC of FIG. 1 according to an example implementation.

Referring to FIG. 6, in accordance with example implementations, the components of the communication interface 158 are structured in a three-layer hierarchy that includes a physical layer 680 (the lowest layer), a link layer 650 (the intermediate layer) and a protocol layer 620 (the highest layer). In general, the physical layer 680 is responsible for low-level link training, serialization/deserialization and byte framing. The link layer 650 has responsibility to correctly accumulate a particular transaction across the communication link path 174 from a series of incoming bits/nibbles/bytes either sourced by the protocol layer 620 for an outbound transaction or received by the physical layer 680 for an inbound transaction. The protocol layer 620 handles higher order transaction metadata, such as source/destination routing information, end-to-end transaction timers and message command and data queues. As also depicted in FIG. 6, in accordance with some implementations, the communication interface 158 includes a clock generation and switching circuit 616, which may generate clock signals for the different layers of tunneling bridge 158.

The physical layer 680 includes a transmit serializer 682 for purposes of transmitting multiple bits of data to the communication interface 182 in synchronization with a clock signal. The physical layer 680 also includes a receive de-serializer 686 that receives multiple bits of data in synchronization with a clock signal. The physical layer 680 may further include control and status registers 683 and a training finite state machine 684. Moreover, the physical layer 680 may include first-in-first out (FIFO) buffers 659 and 663 to buffer the data communicated between the physical layer 680 and the link layer 650.

In accordance with some implementations, the transmit serializer 682 and receive serializer 686 communicate bidirectional data across the communication path 174 (See FIG. 1) synchronized to a source of the transmitter. In other words, the communication path 174, in accordance with example implementations, is a source-synchronous bus. In accordance with some implementations, on each bus clock cycle, four bits of data may be received by the receive de-serializer 686 and four bits of data may be transmitted by the transmit serializer 682. However, in accordance with further implementations, fewer or more bits of data may be communicated. For example, in accordance with some implementations, one bit of data may be transmitted in each direction, thereby reducing the interface to four signals (i.e., one clock and one data signal in each direction). In accordance with some implementations, the number of data bits may be scaled to allow for variable physical layer widths, I/O standards and transceiver technologies, which means that the communication interface 158 may be scaled to faster bus frequencies, new bus standards, and sizes to facilitate increased bandwidth, lower cycle latency and improved performance.

In accordance with example implementations, the link layer 650 interrogates a transaction header, which may be protected with parity information, to ascertain the transaction type and other salient information. Based on the header, the link layer 650 constructs a raw data payload that is either sent out from the physical layer 680 (via the transmit serializer 682) or received by the physical layer 680 (via the receive de-serializer 686). In accordance with example implementations, each transaction that is communicated across the communication link 174 is to be acknowledged with a response; and the link layer 650 generates the outbound responses and checks/expects inbound responses to outbound requests, as appropriate.

In accordance with example implementations, the link layer 650 may include a cyclic redundancy check (CRC) check engine 664 that allows the link layer 650 to perform CRC checks and if appropriate, initiate end-to-end retries in response to detected errors. CRC errors are an example of a number of possible error events that the link layer 650 checks to ensure message integrity. Other errors may correspond to, for example, parity check errors and command coherence errors. In response to an error, in accordance with example implementations, the link layer 650 may initiate link retraining (by the physical layer 680); and the link layer 650 regenerates any outstanding transactions for which the link layer 650 did not observe successful response completions.

In accordance with example implementations, the link layer 650 includes a link status and training finite state machine 660, a transmit processor and data multiplexor 652, and a receive header processor and packet checker 662. The link status and training finite state machine 660 may, for example, initiate link retraining for outstanding transactions that did not result in successful response completions. The transmit processor and data multiplexor 652 may insert CRC code, which is generated by a CRC generation engine logic 658. MRST generation logic 654 is engaged during reset and link training to generate a link message (an MRST message) to indicate to the art receiver that a link is to be retrained. MIDLE generation logic 656 generates a link message (an MDLE message) that is sent whenever the link is otherwise idle and not transmitting other messages. The receive header process and packet checker 662 may interrogate transaction headers to ascertain the transaction type and other salient information. The link status and training finite state machine 660 may be coupled to control the status registers 638 between the link layer 650 and the protocol layer 620; and the control and status registers 638 may be coupled to control status registers 636 of the protocol layer 620. Moreover, a FIFO buffer 627 may buffer incoming bits (from the protocol layer 620) to the link layer 650, and a FIFO buffer 645 may buffer outgoing bits from the link layer to the protocol layer 620.

The transaction ordering and atomicity, in accordance with example implementations, is enforced by the protocol layer 620. In accordance with some implementations, the protocol layer 620 may include, on the transmit side, an inbound response circuit 624 (receiving data from a FIFO buffer 622) and an out-of-bound request circuit 632. The circuits 624 and 632 may have access to the FIFO buffer 624 via an arbiter/multiplexor 626. On the receive side, the protocol layer 620 includes an out and an inbound request circuit 648, an out-of-bound response circuit 642 and a router 644 that controls the routing of the data to the circuit 642 and 644. As depicted in FIG. 6, FIFO circuits 624 and 628 may buffer data incoming into the circuit 624 and 632, respectively; and FIFO buffer 640 and 648 may buffer outgoing data from the circuit 642 and 648, respectively.

Arbiter and switch fabric 614 couples the protocol layer 620 to one or multiple host interfaces 610. As an example, in accordance with some implementations, a particular microprocessor (μP) interface 610-1 may be coupled to a bus that, in turn, is coupled to the general purpose processing cores 154. In accordance with example implementations, the μP interfaces 610 arbitrate for access to the protocol layer 620 via a multiple port message passing switch using a round robin arbitration scheme to ensure fairness. In accordance with example implementations, the arbitration algorithm may be varied to increase the priority of a given μP interface 610 to correspondingly increase the priority of a given initiator class, for example.

As also depicted in FIG. 6, in accordance with example implementations, the communication interface 158 includes a virtual wire encoder/decoder 618 that provides low latency, seamless replay of signals/wires at each end of the communication link 174. In particular, in accordance with example implementations, on the transmit side, the virtual wire encoder/decoder 618 receives signals (called "vwout [57:0]" in FIG. 6) that represent (via their respective assertions) virtually asserted signals, which, are communicated in-band over the communication link 174. On the receive side, the virtual wire encoder/decoder 618 provides signals (called "vwin[57:0]" in FIG. 6), which represents received in-band virtual asserted signals. This virtual wire feature enables lower latency signal replay over the communication link 174 by bypassing the protocol layer 620.

In accordance with example implementations, the communication interface 182 of the logic device 180 may have a design similar to the design of the communication interface 158.

Figure 7:
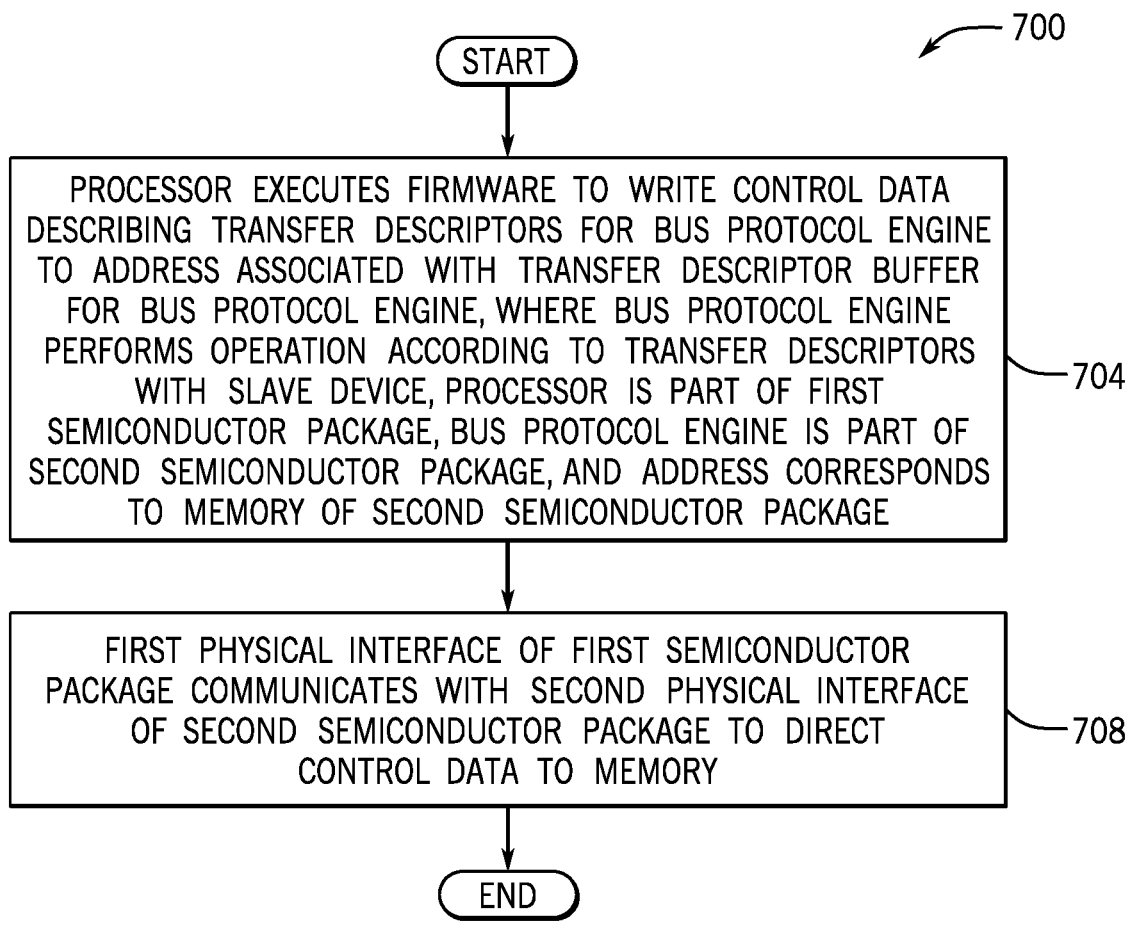
FIG. 7 is a flow diagram depicting a process to direct control data for a bus protocol engine written by a processor on one semiconductor package to a memory located on another semiconductor package according to an example implementation.

Referring to FIG. 7, in accordance with example implementations, a process 800 includes a processor executing (block 704) firmware to write control data describing transfer descriptors for a bus protocol engine to an address that is associated with a transfer descriptor buffer for the bus protocol engine. The bus protocol engine performs an operation according to the transfer descriptors with a slave device; the processor is part of a first semiconductor package; the bus protocol engine is part of a second semiconductor package other than the first semiconductor package; and the address corresponds to a memory of the second semiconductor package. The process 700 includes, pursuant to block 708, a first physical interface of the first semiconductor package communicating with a second physical interface of the second semiconductor package to direct the control data to the memory.

Figure 8:
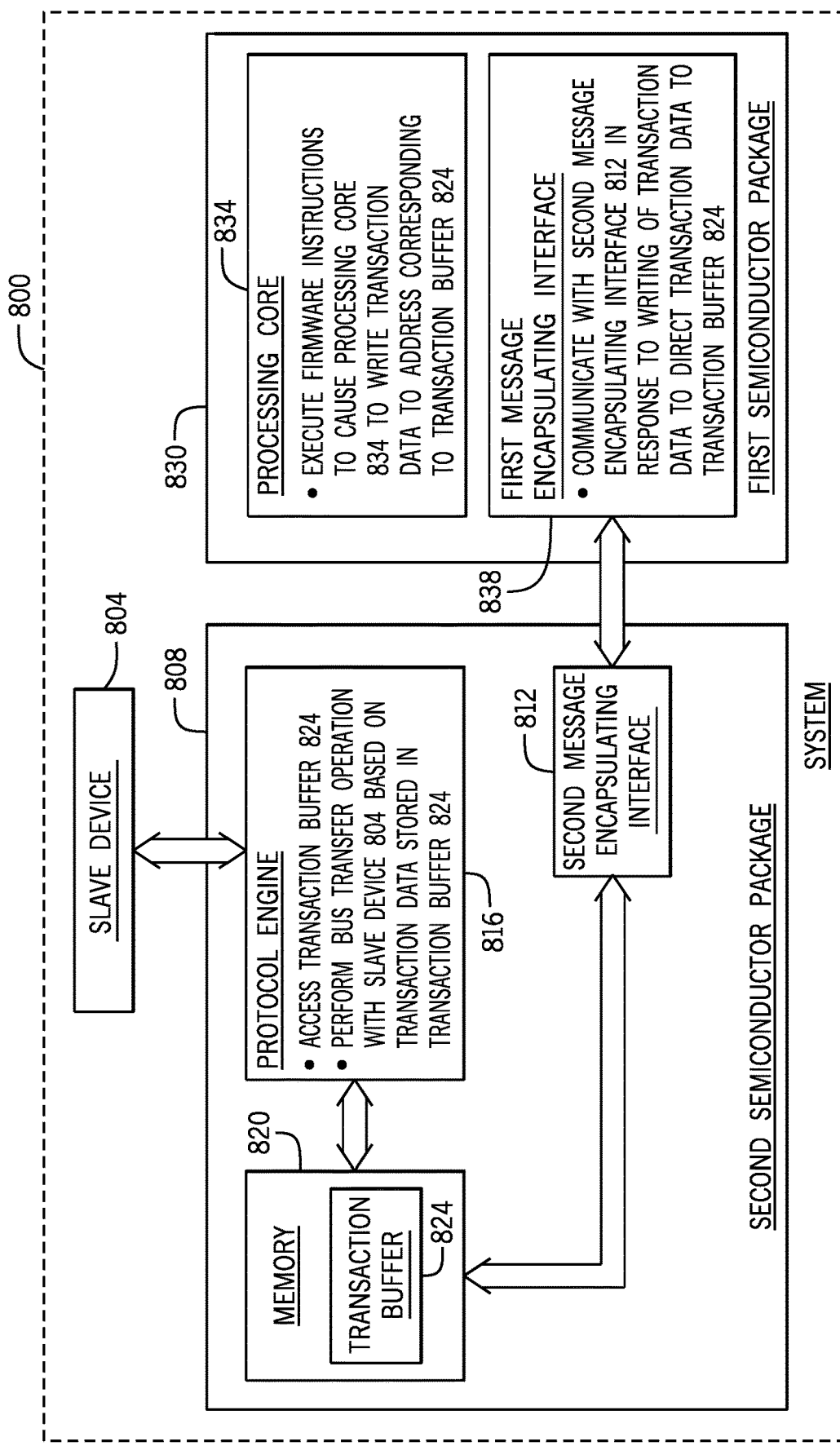
FIG. 8 is a schematic diagram of a system to direct transaction control data written by a processing core on one semiconductor package to a buffer on another semiconductor package according to an example implementation.

Referring to FIG. 8, in accordance with example implementations, a system 800 includes a slave device 804; a first semiconductor package 830; and a second semiconductor package 808. The first semiconductor package 830 includes a processing core 834 and a first message encapsulating interface 838. The processing core 834 executes firmware instructions to cause the processing core 834 to write transaction data to an address corresponding to a transaction buffer 824. The first message encapsulating interface 838 communicates with a second message encapsulating interface 812 in response to the writing of the transaction data to direct the transaction data to the transaction buffer. The second semiconductor package 808 includes the second message encapsulating interface 812; a protocol engine 816; and a memory 820 that includes the transaction buffer 824. The protocol engine 816 is to access the transaction buffer 824 and perform a bus transfer operation with the slave device 804 based on transaction data stored in the transaction buffer 824.

Figure 9:
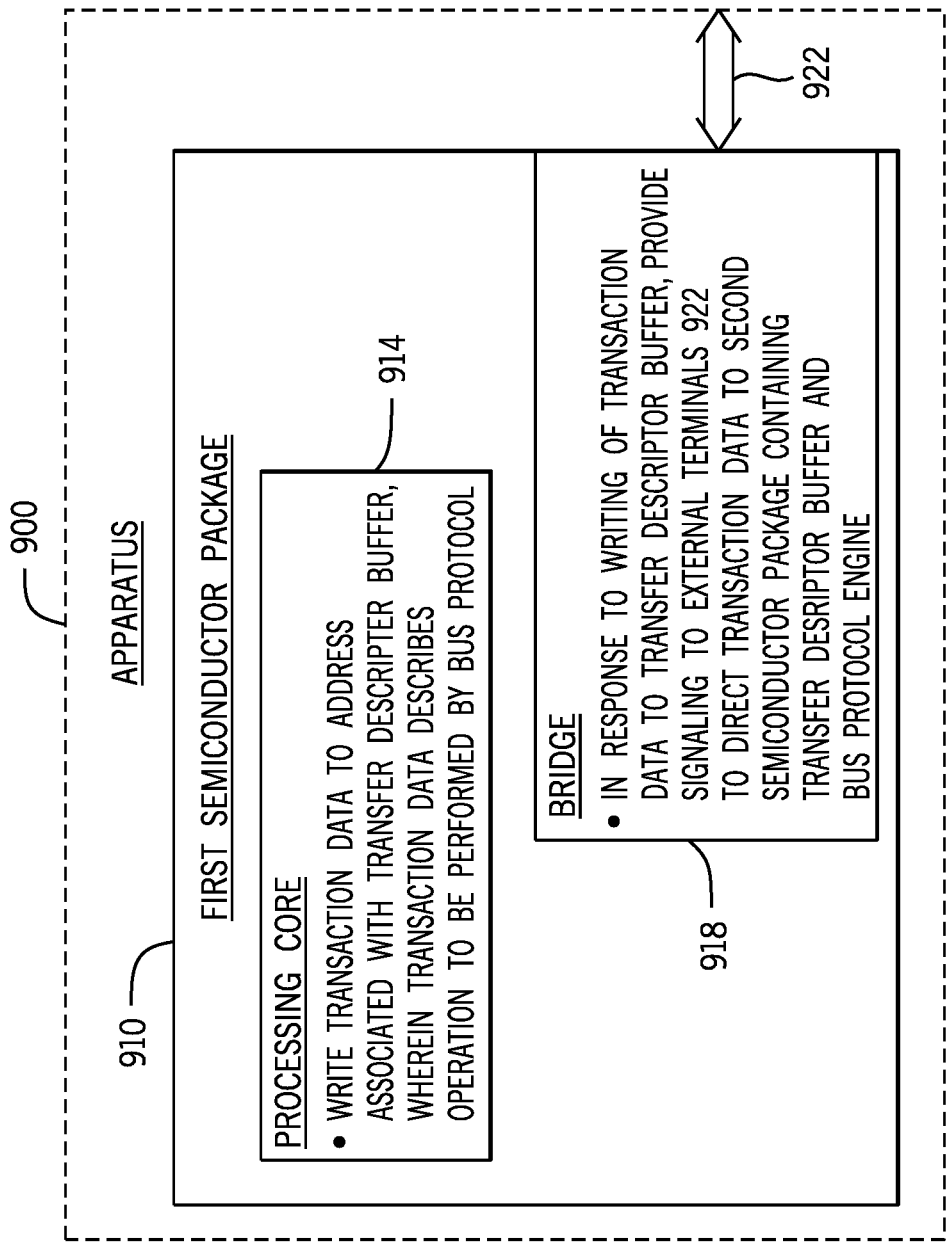
FIG. 9 is a schematic diagram of an apparatus in which control data for a bus protocol engine is directed from one semiconductor package to another semiconductor package according to an example implementation.

Referring to FIG. 9, in accordance with example implementations, an apparatus 900 includes a first semiconductor package 910; a processing core 914; and a bridge 918. The processing core 914 is disposed in the first semiconductor package 910 to write transaction data to an address that is associated with a transfer descriptor buffer. The transaction data describes a bus transfer to be performed by a bus protocol engine. The bridge 918 is disposed in the first semiconductor package 910 to, in response to the writing of the transaction data to the transaction buffer, provide signaling to external terminals 922 of the first semiconductor package 910 to direct the transaction data to a second semiconductor package containing the transfer descriptor buffer and the bus protocol engine.

In accordance with example implementations, the slave device includes a memory device to store memory parameters for a system memory module. The slave device is coupled to a bus. The bus and the memory device are external to the second semiconductor package, and the bus protocol engine initiates a transaction on the bus according to a transfer descriptor to read data from the memory device representing the memory parameters. A particular advantage is that the first semiconductor package may be updated to communicate using the bus without a respin of the first semiconductor package.

In accordance with example implementations, the slave device has a primary function other than storing system data. A particular advantage is that the first semiconductor package may be updated to communicate with the slave device without a respin of the first semiconductor package.

In accordance with example implementations, the address includes a base address corresponding to the first physical interface and an offset address corresponding to the transfer descriptor buffer. A particular advantage is that a first semiconductor package may be modified, via address changes in firmware, to use a bus protocol engine in a second semiconductor package.

In accordance with example implementations, the processor may execute the firmware to write control data to an address that is associated with a control interface of the bus protocol engine; and the first physical interface may communicate with the second physical interface to direct the control data to the control interface. A particular advantage is that firmware-based changes, in lieu of hardware-based changes, may be used to adapt the first semiconductor package to use the bus protocol engine.

In accordance with example implementations, the control data written to the second address represents a start command to initiate a bus transfer that is described by a transfer descriptor. A particular advantage is that firmware-based changes, in lieu of hardware-based changes, may be used to adapt the first semiconductor package to use the bus protocol engine.

In accordance with example implementations, the address that is associated with the control interface includes a base address that corresponds to the first physical interface and an offset address that corresponds to the control interface. A particular advantage is that a first semiconductor package may be modified, via address changes in firmware, to use a bus protocol engine of a second semiconductor package.

In accordance with example implementations, the first physical interface may communicate with the second physical interface to receive an in-band virtual signal assertion that is provided by the bus protocol engine; and in response to receiving the virtual signal assertion, the first physical interface asserts a signal that corresponds to the virtual signal assertion. A particular advantage is that firmware-based changes, in lieu of hardware-based changes, may be used to adapt the first semiconductor package to use the bus protocol engine.

In accordance with example implementations, the virtual signal assertion may be a virtual interrupt, which represents a completion of the operation; and the first physical interface asserting the signal may include the first physical interface generating an interrupt to notify the processor that the operation is complete. A particular advantage is that firmware-based changes, in lieu of hardware-based changes, may be used to adapt the first semiconductor package to use the bus protocol engine.

In accordance with example implementations, the processor may execute firmware to service the interrupt, including the processor initiating a read transaction to read results and an address, where the address includes a base address that corresponds to the first physical interface and an offset address that corresponds to a slave interface of the bus protocol engine. In response to the processor initiating the read transaction, the first physical interface may communicate with the second physical interface to receive data from the second physical interface, which represents the result and provide the data to the processor. A particular advantage is that firmware-based changes, in lieu of hardware-based changes, may be used to adapt the first semiconductor package to use the bus protocol engine.

In accordance with example implementations, the first physical interface communicates structured data for the protocol engine with the second physical interface. A particular advantage is that firmware-based changes, in lieu of hardware-based changes, may be used to adapt the first semiconductor package to use the bus protocol engine.

In accordance with example implementations, the first physical interface communicates with the second physical interface over a message encapsulating interface. A particular advantage is that firmware-based changes, in lieu of hardware-based changes, may be used to adapt the first semiconductor package to use the bus protocol engine.

In accordance with example implementations, the first semiconductor package may be part of a baseboard management controller, and the second semiconductor package may be part of a programmable logic device. A particular advantage is that firmware of the first semiconductor package may be reprogrammed and the programmable logic device may be reprogrammed to accommodate a new interface for the baseboard management controller in lieu of changing the hardware of the first semiconductor package.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   a processor executing firmware to write control data describing transfer descriptors for a bus protocol engine to an address associated with a transfer descriptor buffer for the bus protocol engine, wherein the bus protocol engine performs an operation according to the transfer descriptors with a slave device, the processor is part of a first semiconductor package, the bus protocol engine is part of a second semiconductor package other than the first semiconductor package, and the address corresponds to a memory of the second semiconductor package; and
   a first physical interface of the first semiconductor package communicating with a second physical interface of the second semiconductor package to direct the control data to the memory.

2. The method of claim 1, wherein:
   the slave device comprises a memory device to store memory parameters for a system memory module, wherein the slave device is coupled to a bus;
   the bus and the memory device are external to the second semiconductor package; and
   the bus protocol engine initiates a transaction on the bus according to a transfer descriptor of the transfer descriptors to read data from the memory device representing the memory parameters.

3. The method of claim 1, wherein the slave device has a primary function other than storing system data.

4. The method of claim 1, wherein the address comprises a base address corresponding to the first physical interface and an offset address corresponding to the transfer descriptor buffer.

5. The method of claim 1, wherein the processor further executes the firmware to write control data to a second address corresponding to a control interface of the bus protocol engine, the method further comprising the first physical interface communicating with the second physical interface to direct the control data to the control interface.

6. The method of claim 5, wherein the control data written to the second address represents a start command to initiate a bus transfer described by a transfer descriptor of the transfer descriptors.

7. The method of claim 5, wherein the second address comprises a base address corresponding to the first physical interface and an offset address corresponding to the control interface.

8. The method of claim 1, further comprising:
   the first physical interface communicating with the second physical interface to receive an in-band virtual signal assertion provided by the bus protocol engine; and
   in response to receiving the virtual signal assertion, the first physical interface asserting a signal corresponding to the virtual signal assertion.

9. The method of claim 8, wherein:
   the virtual signal assertion comprises a virtual interrupt representing a completion of the operation; and
   the first physical interface asserting the signal comprises the first physical interface generating an interrupt to notify the processor that the operation is complete.

10. The method of claim 9, further comprising:
    the processor executing firmware to service the interrupt, comprising the processor initiating a read transaction to read a result from an address, wherein the address comprises a base address corresponding to the first physical interface and an offset address corresponding to a slave interface of the bus protocol engine; and
    in response to the processor initiating the read transaction, the first physical interface communicating with the second physical interface to receive data from the second physical interface representing the result of the read transaction and provide the data to the processor.

11. The method of claim 1, wherein:
    the bus protocol engine is associated with a bus; and
    the transfer comprises an operation to read data from the slave device.

12. The method of claim 1, wherein the first physical interface communicating with the second physical interface comprises communicating over a message encapsulating interface.

13. The method of claim 1, wherein:
    the first physical interface communicating with the second physical interface comprises communicating the transaction data over a first set of communication lines; and
    the bus protocol engine has an input control and data interface having an associated second set of communication lines greater in number than the first set of communication lines.

14. A system comprising:
    a slave device;
    a first semiconductor package comprising:
        a processing core to execute firmware instructions to cause the processing core to write transaction data to an address corresponding to a transaction buffer; and
        a first message encapsulating interface to communicate with a second message encapsulating interface in response to the writing of the transaction data to direct the transaction data to the transaction buffer; and
    a second semiconductor package comprising:
        the second message encapsulating interface;
        a protocol engine; and
        a memory comprising the transaction buffer, wherein the protocol engine is to access the transaction buffer and perform a bus transfer operation with the slave device based on transaction data stored in the transaction buffer.

15. The system of claim 14, further comprising a baseboard management controller, wherein the second semiconductor package is part of the baseboard management controller.

16. The system of claim 14, further comprising:
a host processor; and
a baseboard management controller;
wherein:
- the second semiconductor package is part of the baseboard management controller;
- the system memory device is associated with memory parameters;
- the bus transfer operation comprises a read operation to read data representing the memory parameters; and
- the baseboard management controller communicates the data representing the memory parameters to the host processor.

17. An apparatus comprising:
a first semiconductor package;
a processing core disposed in the first semiconductor package to write transaction data to an address associated with a transfer descriptor buffer, wherein the transaction data describes a bus transfer to be performed by a bus protocol engine; and
a bridge disposed in the first semiconductor package to, in response to the writing of the transaction data to the transfer descriptor buffer, provide signaling to external terminals of the first semiconductor package to direct the transaction data to a second semiconductor package containing the transfer descriptor buffer and the bus protocol engine.

18. The apparatus of claim 17, wherein the bridge comprises a full duplex, message encapsulating and error correcting interface.

19. The apparatus of claim 17, wherein:
the bus protocol engine comprises a serial bus interface;
the bus transfer comprises a transfer to read data from a device; and
the processing core writes the transaction data to an address comprising a base address corresponding to the bridge and an offset address corresponding to the transfer descriptor buffer.

20. The apparatus of claim 17, further comprising a baseboard management controller, wherein the first semiconductor package is part of the baseboard management controller.

* * * * *